United States Patent Office

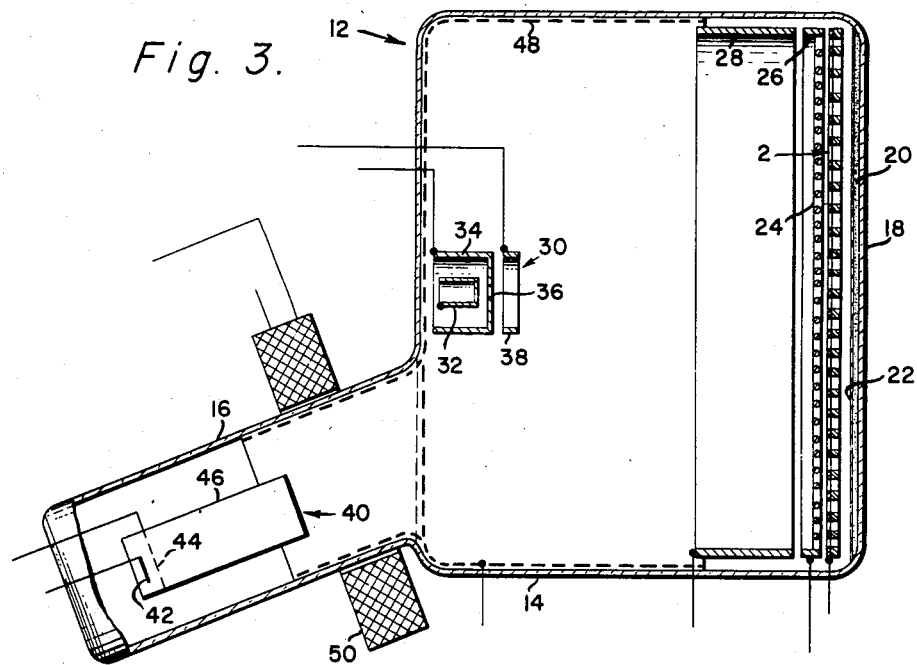
Fig. 3.
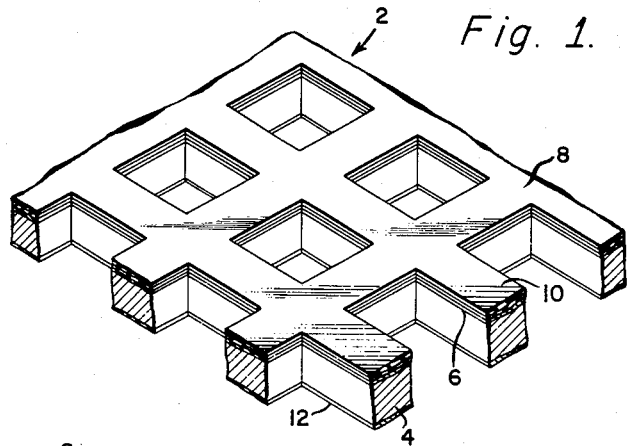
Fig. 1.
Fig. 2.
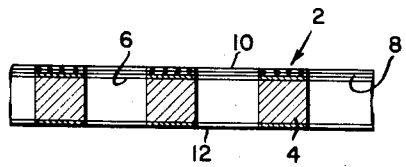
Norman H. Lehrer,
Raymond A. Solivan,
INVENTORS.
BY.
ATTORNEY.

3,089,050
Patented May 7, 1963

3,089,050
STORAGE TARGET
Norman H. Lehrer, Los Angeles, and Raymond A. Solivan, Culver City, Calif., assignors to Hughes Aircraft Company, Culver City, Calif., a corporation of Delaware
Filed Oct. 4, 1960, Ser. No. 60,484
6 Claims. (Cl. 313—68)

This invention relates to storage targets for visual display cathode ray tubes and to methods for making such targets. More particularly, the invention relates to storage targets utilizing the phenomenon of bombardment induced conductivity and including a film of cubic zinc sulfide on a metallic mesh support.

In the copending application, Serial No. 59,590, filed September 30, 1960, in the name of Norman H. Lehrer and assigned to the instant assignee, a novel bombardment induced conductivity storage target is described comprising a nickel mesh screen having a film of cubic zinc sulfide disposed on one surface thereof. In visual display storage tubes this storage target is disposed relatively near the viewing screen of the tube which has a relatively high voltage (i.e., 6000 volts) impressed thereon for accelerating flood or viewing electrons to the viewing screen after they have penetrated the storage target in accordance with the storage potentials thereon. The storage target thus is subject to the influence of the viewing screen field and unless the mesh screen has sufficient strength, the effect of this field thereon is to distort the screen, generally causing it to bow toward the viewing screen. Such distortion may produce non-uniform or distorted visual displays on the face of the tube.

In one mode of operating the visual display storage tube described in the aforementioned copending application, the potential on the storage screen mesh (or backplate) is negative which negative potential is removed at selected areas in accordance with information to be stored thereon and visually displayed. Because of the negative potential on the storage screen, it is necessary to employ a screen which has a relatively high transmission (about 60%) in order to allow flood or viewing electrons to penetrate and pass through the storage target. However, a storage screen having such a relatively high transmission is not sufficiently strong to prevent its being distorted by the viewing screen field.

It has also been noticed that when a bombardment induced conductivity storage target is constructed with the layer of cubic zinc sulfide applied directly on a nickel screen, the screen tended to become embrittled and the resistivity of the dielectric tended to deteriorate. It is suspected that interaction between the nickel and zinc sulfide is the cause of such difficulties. At any rate, a storage target constructed in accordance with the present invention is not characterized by such undesirable tendencies.

It is therefore an object of the present invention to provide an improved bombardment induced conductivity storage target for visual display cathode ray tubes.

Another object of the invention is to provide an improved zinc sulfide-type storage target for visual display cathode ray tubes.

Still another object of the invention is to provide an improved zinc sulfide-type storage target which is physically strong, and capable of maintaining uniform electrical characteristics.

Another object of the present invention is to provide an improved method for making a zinc sulfide-type storage target for visual display cathode ray tubes.

These and other objects and advantages of the invention are accomplished by incorporating a metallic coating on a high transmission nickel screen and applying the bombardment induced conductivity dielectric cubic zinc sulfide over the metallic coating. The metallic coating is a metal which does not react with the cubic zinc sulfide nor with the nickel of the screen base member. In addition to preventing interaction between the cubic zinc sulfide and the nickel of the screen, the metallic coating physically strengthens the screen so that it is not distortable by the viewing screen field. It is thus possible to provide a storage target of the bombardment induced conductivity type which has a relatively high transmission (i.e., 60%).

The invention will be described in greater detail by reference to the drawings in which:

FIG. 1 is a cut-away perspective view of the storage target of the present invention;

FIG. 2 is a cross-sectional elevational view of the storage target shown in FIG. 1; and FIG. 3 is a partially cross-sectional and partially schematic view of a cathode ray storage tube employing the storage target of the present invention.

With reference to FIGS. 1 and 2, the storage target 2 of the present invention comprises an electroformed nickel mesh screen 4 having a layer 6 of rhodium coated thereon and a film 8 of cubic zinc sulfide coated over the rhodium layer 6. The nickel screen 4 may have from 100 to 400 meshes per inch, preferably 250 meshes per inch, and a thickness of about 1 to 2 mils. The transparency of such a screen with a pitch of 250 meshes per inch will be about 60%. The cubic zinc sulfide layer 8 may also be coated, as shown, with a thin film 10 of a good secondary electron emissive material such as magnesium fluoride. The opposite surface of the nickel screen 4 may be provided with a thin film 12 of gold coated thereon by conventional gold evaporation techniques.

One of the purposes of the rhodium layer 6 is to strengthen and ruggedize the relatively high transmission nickel screen 4 so as to prevent its being distorted by the relatively strong electric field of the viewing screen near which the storage target 2 is intended to be disposed in a direct viewing storage tube as will be shown and described in greater detail hereinafter. In addition the rhodium layer 6 acts to chemically isolate the layer 8 of cubic zinc sulfide from the nickel screen 4 with which it would otherwise react or become contaminated by causing the cubic zinc sulfide film to lose its peculiar efficacy as a bombardment induced conductivity material. It is believed that this contamination or reaction may take either of two forms, or possibly both. In the first place the nickel screen may become embrittled by the action of free sulfur from the sulfide therewith. On the other hand, the formation and presence of nickel sulfide will contribute to the deterioration of the dielectric properties and qualities of the cubic zinc sulfide. It has been found that cubic zinc sulfide and rhodium are substantially inert chemically with respect to each other and that in addition the rhodium plating on the nickel screen tends to strengthen the screen physically so as to prevent its distortion by the aforementioned electric fields in or near which the nickel screen may be disposed.

The purpose of the secondary emissive coating 10 over the cubic zinc sulfide layer 8 is preferred in order to provide a good secondary electron emissive surface on the storage target 2 to enhance the charging of the storage target by the phenomenon of secondary electron emission as more fully taught in the aforementioned copending application, although for some purposes the secondary emissive characteristics of the cubic zinc sulfide film 8 will be sufficient so as to permit this additional layer of secondary emissive material to be omitted.

The purpose of the gold plating 12 on the opposite side of the storage screen 4 is to cover any dielectric particles which may be inadvertently deposited on this side. Such particles tend to charge electrically in an irregular pattern making a non-uniform visual display.

The film 10 of secondary emissive material may be about 500 Angstroms thick, for example, and applied over the layer 6 of cubic zinc sulfide by evaporation. Magnesium fluoride is an excellent material for the purposes of the present invention because of its superior secondary emissive characteristics. This secondary emissive layer should be thin enough to allow a relatively high energy level electron beam (i.e., one of about 7 kv.) to penetrate therethrough to the cubic zinc sulfide layer 6 so that electrons therein may be raised to the conductive energy level. The secondary emissive layer should be thin enough to provide high secondary electron emission when bombarded by a relatively low energy level electron beam (i.e., one of about 2.5 kv.).

The thickness of the rhodium plating is not critical and may be between 10 to 40 millionths of an inch thick. The plating has a tendency to "peel" when the thickness exceeds 40 millionths of an inch. If the plating is too thin, it will not provide the necessary isolation of the cubic zinc sulfide from the support member 4. The rhodium plating 6 may be about 25 millionths of an inch thick, for example, and may be applied by the following process. The nickel screen 4 is first thoroughly degreased and cleaned by known techniques. Thus, for example, the nickel screen may be thoroughly degreased in a vapor degreaser followed by firing in hydrogen at 450° C. to 550° C. for about 30 minutes. Thereafter the nickel screen is treated in a cleaning solution at about 180° F. and then rinsed in hot de-ionized water. This cleaning solution consists of 2 oz. of tri-sodium phosphate, 3 oz. of caustic, and ⅓ oz. of mecanol in a gallon of water. The final preparatory step is to immerse the screen in a solution of hydrochloric acid (1 part of concentrated acid to 1 part of water), for about 30 seconds followed by a rinse in 10% sulphuric acid.

An excellent rhodium plating solution which may be employed is made up as follows: 5 grams of rhodium sulphate and 35 cc. of sulphuric acid are added and mixed with one liter of water. The temperature of the plating bath is maintained at about 115° F. during the plating. The rhodium is electrically plated onto the nickel screen from this solution using a starting plating current of 2 amperes which is immediately reduced to 1 ampere and maintained for about 4 minutes after which it will be found that a plating of rhodium about 25 millionths of an inch thick will have been formed on the nickel screen.

In practice the nickel screen is usually mounted on a stainless steel ring prior to plating the screen with rhodium. It may therefore be desirable to rhodium plate the entire storage target assembly (comprising the nickel screen 4 and the stainless steel mounting ring 26 shown in FIGURE 3). Because rhodium does not plate and adhere well to stainless steel, the stainless steel ring 26 is nickel plated prior to mounting the screen thereon. After the stainless steel ring 26 has been nickel plated and the nickel screen 4 mounted thereon as by welding, the assembly may then be rhodium plated by the technique described hereinabove.

The stainless steel ring 26 may be nickel plated by any conventional nickel-plating technique which may be convenient. A suitable procedure for achieving this plating operation is as follows. The ring is first thoroughly degreased in a vapor degreaser and then fired in hydrogen for about 20 minutes at about 1100° C. The ring is then electrolytically cleaned by immersion in the aforementioned cleaning solution maintained at about 180° F. with the ring as the cathode and a current of about 20 amperes for about 2½ minutes after which the current is reversed for about 30 seconds. The ring is then rinsed in de-ionized water and soaked in a solution of nitric acid (1 part concentrated acid to 1 part water, both parts by volume) for at least 30 minutes, followed by a rinse in de-ionized water and a 5-to-10 second dip in a solution of hydrochloric acid (1 part concentrated acid to 1 part water, both parts by volume), and then a final rinse in de-ionized water.

Plating the ring with nickel is accomplished by the use of two electroplating baths as follows. The first plating bath is a solution made up of 2 lbs. of nickel chloride and 1 pint of hydrochloric acid (conc.) to a gallon of water. The ring is immersed in this solution for 15 minutes. A plating current which is about 20 amperes initially, but immediately reduced to about 3 amperes is then applied and maintained for about 6 minutes.

The ring is then immediately transferred to a second solution consisting of 26 oz. of nickel sulfide, 23 oz. of nickel chloride, and 5.3 oz. of boric acid all to one gallon of water. This bath is maintained at about 150° F. during plating. A plating current of about 6 amperes is maintained for about 2 minutes after which the stainless steel ring has an adherent nickel plating and to which the nickel screen 4 may be welded.

After the storage target 2 has been prepared and assembled it is then incorporated in a selective erasure direct-viewing storage tube 12 as shown in FIG. 3. The tube 12 comprises an evacuated envelope formed by a comparatively large cylindrical section 14 and a narrower neck portion 16 communicating therewith at one side thereof (hereinafter referred to as the neck or gun side). The neck section 16 may be disposed, as shown, at an angle with respect to the main longitudinal axis of the larger cylindrical section 14. The side of the large cylindrical section 14 opposite the neck side comprises a face-plate 18 over the inner surface of which is a layer 20 of phosphor material covered with a thin film of aluminum 22. Adjacent and coextensive with the face-plate or viewing screen 18 is the storage target 2 as described previously and shown in FIGS. 1 and 2. Continuing to proceed from the viewing screen end of the tube toward the gun section, a collector grid 24 is disposed adjacent and coextensive with the storage target 2. The collector grid 24 comprises a conductive screen supported about its periphery by an annular ring 26. The transparency of this screen is preferably of the order of 80%; the function of the grid 24 is to collect secondary electrons emitted from the storage target 2. Adjacent the collector grid 24 is a collimating electrode 28 in the form of a cylindrical can the purpose of which is to collimate flood or viewing electrons from the flood gun 30 which is disposed at the gun side of the tube section 14. The flood gun 30, which may be on the longitudinal axis of the larger cylindrical portion 14 of the tube 12, comprises a cathode 32 and an intensity electrode 34 which encloses the cathode 32 except for a small aperture 36 disposed over the central portion of the cathode 32. An annular accelerating electrode 38 is disposed adjacent the intensity electrode 34 and coaxially with respect to the longitudinal axis of the tube 12 which also passes through the center of the aperture 36 in the intensity electrode 34.

The neck portion 16 of the tube 12 houses an electron gun 40 which may be of conventional construction. The gun 40 comprises a cathode 42, an intensity electrode grid 44, and a cylindrical beam-forming section 46.

An equipotential region is maintained throughout the neck portion 16 of the larger cylindrical section 14 of the tube 12 by means of a conductive layer 48 which may be coated over the interior surfaces of the tube as shown. During operation, a potential of about 5 volts positive may be maintained on this conductive layer.

Operation of a selective erasure storage tube may be accomplished with the storage target backplate potential negative as follows. A potential of about 9 volts negative relative to ground is applied to the nickel mesh support 4 of the storage target. The flood or viewing gun cathode 32 may be maintained at ground potential while the intensity electrode 34 and the annular electrode 38 may be maintained, respectively, at potentials of about 20 volts negative and 100 volts positive with respect to ground. Under these circumstances flood electrons from the gun 30 will be prevented from penetrating the storage target 2 (because of the 9-volt negative potential thereon). Hence the flood or viewing electrons cannot reach the viewing screen and excite it into luminescence. This is the initial "dark" condition of the tube and in this mode of operation, information is displayed as "white on black."

To store and display information, the storage target 2 is scanned by an electron beam of elemental cross-sectional area having an energy level of about 2.5 kilovolts. This beam may be generated by means of the electron gun 40 in the neck portion 16 of the tube. The cathode 42 of this gun may be maintained at a potential of about 2000 volts negative with respect to ground while the intensity grid 44 may be at a potential of about 75 volts negative with respect to the potential of the cathode 42. The electron beam produced by this gun is modulated and scanned in accordance with information-representative signals derived and applied by conventional techniques. The beam is deflected horizontally and vertically electromagnetically, as shown, by means of the deflection yoke 50 which is positioned around the neck 16 of the tube.

Areas of the storage target 2 impinged by the 2.5 kv. beam in accordance with the information to be displayed are charged positively due to the emission of electrons therefrom which are collected by the collector grid 24 which may be maintained at a potential of 120 volts positive with respect to ground in order to accomplish this function. Viewing or flood electrons from the flood gun 30 may then pass through the storage target 2 at these areas of positive potential and are then accelerated to the viewing screen by means of a potential of about 6,000 volts positive with respect to ground which may be maintained on the aluminum film 22 of the viewing screen. In this manner the information is displayed as "white on black" and the display may be maintained and viewed as long as desired.

Non-stored or "live" information may also be simultaneously displayed by switching the potential of the cathode 42 of the charging gun 40 to about 4.5 kilovolts. As explained previously a beam of this energy level does not produce any change in the potential of the storage surface. Hence, the beam passes through the storage target 2 without altering the potential of either positively or negatively charged portions. In this respect the storage tube of the present invention is a marked improvement over storage tubes of the past wherein storage was achieved solely by the phenomenon of secondary emission.

Stored potentials on the storage target 2 may be selectively erased by switching the potential of the cathode 42 of the charging gun 40 to about 7.0 kilovolts and scanning the storage target with the beam of this energy level in accordance with signals representing the information to be erased. The impingement of a beam of 7.0 kv. on portions of the storage target results in these portions being charged negatively to about the potential of the nickel support mesh 4 (−9 volts) by means of the phenomenon of bombardment induced conductivity, as explained previously.

It will be noted that the storage tube shown in FIG. 3 and described herein has but one charging electron gun whose cathode potential is switched to provide beams of different energy levels (2.5 kv., 4.5 kv., and 7.0 kv.) so as to permit storing, "writing-through," and erasing selectively. When only a single charging gun is provided the operations of storing, "writing-through," and erasure cannot be accomplished simultaneously.

As taught in the aforementioned copending application, a multiple gun cathode ray storage tube may be utilized. By incorporating more than one electron gun (other than the flood gun) in the tube, any two of the three operations (i.e., storing, erasing and write-through) may be accomplished simultaneously. As used herein when reference is made to the number of electron guns, the flood gun is not intended to be included therein. By including three electron guns in the envelope, all three operations may be achieved simultaneously.

There thus has been described a novel and improved storage target for cathode ray tubes utilizing the phenomenon of bombardment induced conductivity effectively and in a practical manner. While the storage target of the present invention has been described with particular reference to the use of rhodium plating to ruggedize the storage mesh and to prevent reactions between the metal of the mesh and the layer of cubic zinc sulfide, the practice of the invention is not limited to the use of such material. Any metal which is non-reactive with the cubic zinc sulfide may be employed. In particular any member of the platinum family is satisfactory for the purposes of the present invention. Hence, in addition to rhodium, ruthenium, palladium, osmium, iridium, and platinum may be employed.

What is claimed is:

1. In a storage target for a storage tube wherein said target includes a layer of cubic zinc sulfide and a metallic support member therefor of a material which is chemically reactive with cubic zinc sulfide, the improvement comprising: an intermediate layer of material which is non-reactive chemically with cubic zinc sulfide disposed between said support member and said layer of cubic zinc sulfide.

2. The invention according to claim 1 wherein said intermediate layer is a metal selected from the platinum family.

3. The invention according to claim 1 wherein said intermediate layer is rhodium.

4. In a storage target for a storage tube wherein said target includes a layer of cubic zinc sulfide and a nickel support member therefor, the improvement comprising: an intermediate layer of material which is non-reactive with cubic zinc sulfide disposed between said support member and said layer of cubic zinc sulfide.

5. A storage target for a storage tube comprising a conductive support member of a material which is reactive with cubic zinc sulfide, a layer on said support member of a material which is non-reactive with cubic zinc sulfide, a layer of cubic zinc sulfide disposed on layer of non-reactive material, and a film of secondary emissive material disposed on said layer of cubic zinc sulfide.

6. A cathode ray storage tube comprising means for forming electron beams of different energy levels, and a storage target comprising a metallic support member of a material which is chemically reactive with cubic zinc sulfide, a layer on said support member of a material which is non-reactive chemically with cubic zinc sulfide, and a layer of cubic zinc sulfide disposed on said layer of non-reactive material.

References Cited in the file of this patent

UNITED STATES PATENTS

| | | |
|---|---|---|
| 2,435,436 | Fonda | Feb. 3, 1948 |
| 2,817,781 | Sheldon | Dec. 24, 1957 |
| 2,858,463 | Koda et al. | Oct. 28, 1958 |
| 2,887,597 | Smith et al. | May 19, 1959 |